United States Patent [19]

Issel et al.

[11] Patent Number: 5,057,289
[45] Date of Patent: Oct. 15, 1991

[54] PROCESS FOR THE SEPARATION OF URANIUM FROM A RADIOACTIVE FEED SOLUTION CONTAINING TECHNETIUM

[75] Inventors: Wolfgang Issel, Karlsruhe; Werner Knoch, Springe; Hartmut Ramm, Burgdorf, all of Fed. Rep. of Germany

[73] Assignee: Deutsche Gesellschaft fur Wideraufarbeitung von Kernbrennstoffen mbH, Hanover, Fed. Rep. of Germany

[21] Appl. No.: 321,636

[22] Filed: Mar. 9, 1989

[30] Foreign Application Priority Data

Mar. 18, 1988 [DE] Fed. Rep. of Germany ....... 3809042

[51] Int. Cl.$^5$ ............................................. B01D 11/04
[52] U.S. Cl. ......................................... 423/10; 423/8; 423/20
[58] Field of Search ................... 423/2, 4, 8, 10, 20, 423/251; 422/159

[56] References Cited

U.S. PATENT DOCUMENTS

| | | | |
|---|---|---|---|
| 3,949,049 | 4/1976 | Ochsenfeld et al. | 423/10 |
| 4,080,273 | 8/1978 | De Poorter et al. | 204/157.1 R |
| 4,162,230 | 7/1979 | Horwitz et al. | 252/627 |
| 4,443,413 | 4/1984 | Pruett et al. | 423/10 |
| 4,528,165 | 7/1985 | Friedman | 423/10 |
| 4,656,011 | 4/1987 | Garraway et al. | 423/10 |
| 4,764,352 | 8/1988 | Bathellier et al. | 423/10 |

OTHER PUBLICATIONS

Perry et al., Chemical Engineers' Handbook, 5th Ed., 15-15.

Primary Examiner—Edward A. Miller
Assistant Examiner—Ngoclan T. Mai
Attorney, Agent, or Firm—Allegretti & Witcoff, Ltd.

[57] ABSTRACT

A process for the separation of uranium and plutonium as well as fission products including technetium from a nitric acid feed solution (fuel solution) in which said solution is treated with an extraction agent in an organic solvent to charge said agent with U, Pu and fission products including technetium by the counterflow process. The charged extraction agent containing U, Pu and fission products including technetrium is treated with a washing solution and subsequently with a reducing agent for the separation of the uranium from the plutonium and from fission products including technetium not previously washed out. To improve the separation of uranium and obtain a cleaner uranium end product, the treatment of the organic solvent containing said charged agent with reducing agent is effected in one or more stages by the crossflow process instead of by the counterflow process. A single- or multi-stage pretreatment with reducing agent by the crossflow process may be provided in advance of the counterflow treatment with reducing agent.

2 Claims, 1 Drawing Sheet

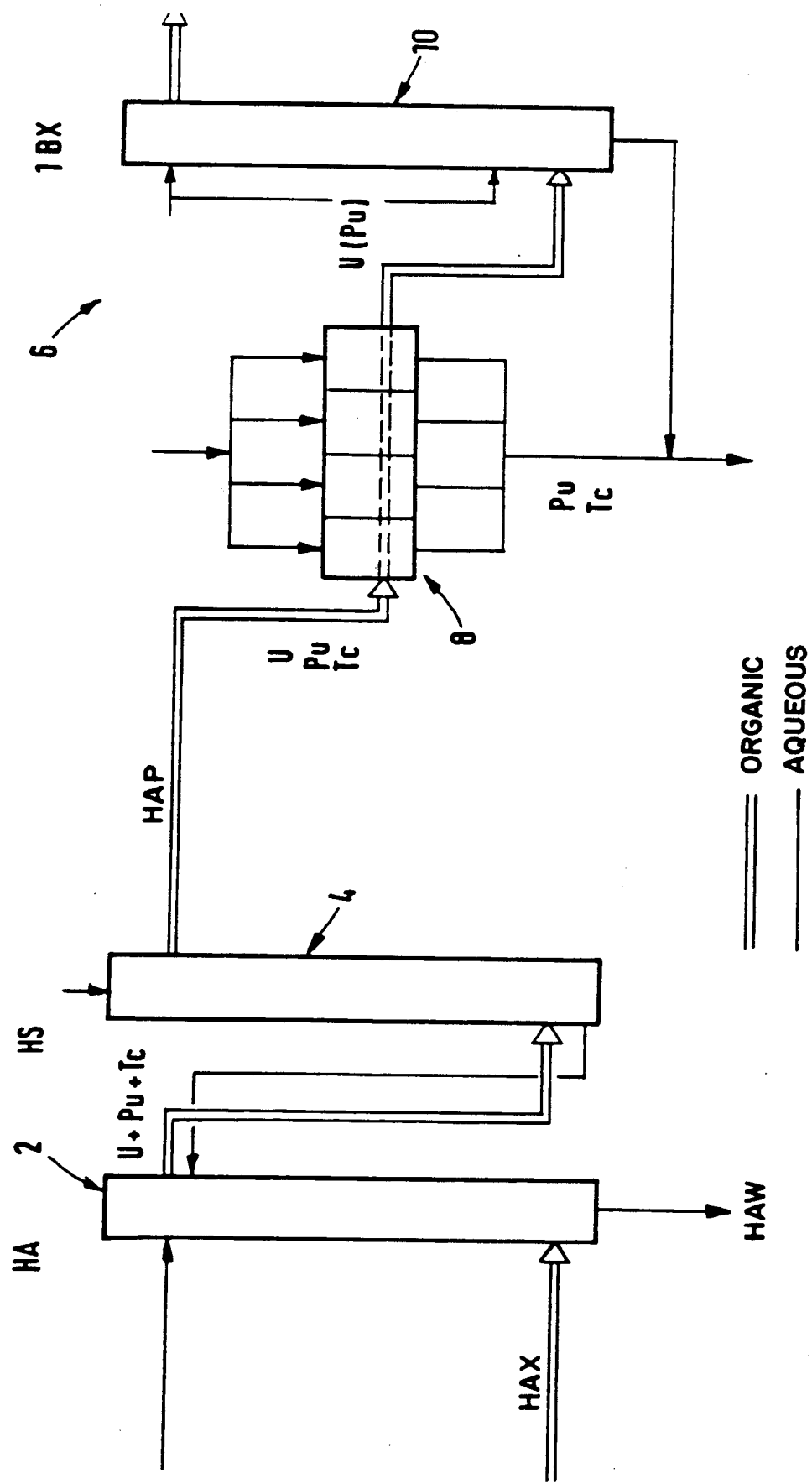

PROCESS FOR THE SEPARATION OF URANIUM FROM A RADIOACTIVE FEED SOLUTION CONTAINING TECHNETIUM

The invention is concerned with a process for the separation of uranium from a radioactive feed solution containing uranium, plutonium and fisson products.

BACKGROUND OF THE INVENTION

In the reconditioning of spent nuclear fuels, the fuel (uranium and plutonium oxide) and the fission products are dissolved in nitric acid. After filtration, the addition of nitric acid or water, and concentration, the solution is fed to a liquid-liquid-counterflow-extraction process known as the PUREX process for the separation of uranium, plutonium and fission products (cf. Kerntechnik, 1978, No. 2, pages 77–79). In this extraction process tri-n-butylphosphate (TBP) is the extraction agent in the form of an organic solution of TBP in kerosene for uranium and plutonium (designated below by the chemical symbols U and Pu).

THE PRIOR ART

The nitric acid feed solution containing U, Pu and fission products is fed into an extraction column at the top while the lighter organic extraction agent is fed in from the bottom. On the way up, the extraction agent becomes charged with U and Pu. In doing so, traces of fission products are also extracted with them. In order to separate these fission products, the charged extraction agent subsequently runs through a washing procedure with nitric acid in a washing column. The stream containing the fission products leaves the column at the bottom as refined product. The organic product flow containing U and Pu is fed as feed solution into a separation column. The Pu, present in the organic phase in the tetravalent or hexavalent state, is reduced by a flow of reducing agent (uranium (IV) nitrate and hydrazine nitrate) to organically poorly-soluble Pu (III) and backwashed into the aqueous phase. U remains undissolved as U(VI) in the organic phase. The aqueous product flow of Pu leaves the separation column at the foot while the organic product flow of U escapes at the head and is fed as feed solution into a backwash column at the bottom. Through an aqueous backwash solution (nitric acid) fed into this backwash column from the top, the uranium is backwashed out of the organic into the aqueous phase.

The aqueous uranium product flow leaves the column at the foot and the spent extraction agent escapes at the head and after running through a solvent wash may be fed back into the cirucit.

The columns employed today are usually pulsated, i.e., rapid pulselike motions are superimposed upon the flows in order to bring the two phases (product flow and extraction agent or reducing agent) into intensive contact. Mixer-settlers may also be employed but they are mechanically more complicated than the columns.

In order to achieve the best possible separation after the first extraction cycle described, further purification cycles must usually be provided, which increases the expense.

In the case of the uranium (IV) nitrate and hydrazine nitrate mainly used today as reducing agent, a heavy excess of U (IV) is necessary in order to achieve a quantitative separation of the uranium. Hydrazine represents a stabilizing agent by functioning as "$HNO_2$-catcher".

That is, $HNO_2$ oxides $Pu^{3+}$ to $Pu^{4+}$ which is soluble in the organic phase.

The fission products T (tritium), Zr (zirconium), Tc (technetium) and Np (neptunium) cause special problems; Tc in particular being a problem in the extraction, because a not insignificant part becomes extracted with the uranium and plutonium.

Since for enrichment there must be available the purest possible uranium end product, a uranium end product contaminated by technetium may not be acceptable. A further disadvantage of the technetium lies in the catalytic action in the separation column. Through catalytic action hydrazine is destroyed. This is extremely undesirable since it produces instabilities in the process. As regards the catalytic action reference may be made to the publication ISEC, Munich 1986, page I-137 to page I-142.

THE INVENTION

The object of the present invention consists in improving the process so that the disadvantages described are avoided, the separation of uranium and plutonium in particular is improved and a cleaner uranium end product is obtained.

In accordance with the invention, the residence time in the separation phase, in the crossflow mixer-settler stage, or the individual crossflow mixer-settler stages is significantly reduced. By reducing the reaction time between the technetium (Tc) and the reducing agent (U(IV) nitrate and hydrazine nitrate) Tc may be reduced and practically quantitatively removed from the organic phase. At the same time Pu is reduced to and largely backwashed into the aqueous phase. Because of the short reaction time the undesirable destruction of the hydrazine caused by the catalytic effect of the technetium is minimized. Through the shorter reaction times in the crossflow process the following advantages are achieved in accordance with the invention:

- avoidance of undesirable secondary reactions injurious to the extractive separation;
- higher yield by the reducing agent;
- reduction in waste;
- considerably cleaner separation of uranium;
- increase in the chemical and hydraulic stability of the process;
- possibility of reduction in the amount of hydrazine added in the separation stage.

DETAILED DESCRIPTION

The invention will be explained in greater detail below with the aid of a diagrammatic embodiment represented in the attached drawing.

BRIEF DESCRIPTION OF THE DRAWINGS

The drawing shows a flow diagram for a first extraction cycle according to the liquid-liquid-countercurrent flow-extraction process (PUREX process) with an additional stage in the separation phase.

A feed solution (fuel solution) containing U, Pu and fission products is fed into an extraction column (HA) 2 at the top. From the bottom in the opposite direction to the feed solution flows a specifically lighter organic extraction agent (HAX) which is preferably an organic solution of tri-n-butylphosphate (TBP) in kerosene. On the way up the extraction agent becomes charged with U and Pu as well as with fission elements such as Tc.

The extraction column 21 connects to a wash column (HS) 4 into which the charged extraction agent is fed from the bottom and subjected in countercurrent flow to a washing procedure with nitric acid which is fed in from the top in order to wash extracted fission products out of the organic phase. The nitric acid wash solution from the bottom of column 4 is fed into the extraction column 2 at the top. The combined aqueous flow containing the extracted fission elements leaves the extraction column 2 at the bottom as a refined product (highly active waste, HAW).

The organic product flow (HAP) containing U and Pu and some fission products designated "problem elements" among which is technetium, flows out at the head of the wash column 4 and is fed as feed solution to a separation station designated generally at 6. The product flow first of all flows through a crossflow mixer-settler 8 which is represented here as four-stage unit. In each stage the organic flow running continuously through the stages is only briefly treated in crossflow by a reducing agent (uranium(IV) nitrate and hydrazine nitrate) which is subdivided into separate partial streams each of which acts upon only one extraction stage of the crossflow mixer-settler 8.

The aqueous solution charged with Pu and Tc is discharged from each stage of the crossflow mixer-settler 8, the concentration of the extracted substances Pu and Tc decreasing continuously from stage to stage.

The organic product flow containing uranium and possibly some residual small proportions of Pu, after leaving the crossflow mixer-settler 8, is fed into the bottom of a separation column 10. The specifically heavier reducing agent flows from the top in the opposite direction to the organic product flow. The reducing agent charged with Pu leaves the separation column at the bottom, while the organic product flow now containing practically only U flows out of the separation column 10 at the top and is fed to further stations for the recovery of the clean uranium end product foreseen for the enrichment process.

In the drawing, the separation station 6 includes the crossflow mixer-settler 8 as a stage before the separation column 10. But the separation station 6 may also consist only of the crossflow mixer-settler 8. The crossflow mixer-settler may be made single- or multi-stage, depending upon the existing conditions.

What is claimed is:

1. A process for separating uranium from a radioactive feed solution containing uranium, plutonium and fission products including technetium, consisting of
   (a) treating said feed solution with an organic extraction agent to charge said agent with U, Pu and fission products including Tc;
   (b) passing said charged organic agent across multiple individual flowing streams of an aqueous reducing agent to remove Pu and fission products including Tc from the U-containing organic extraction agent; and
   (c) recovering said U from said organic extraction agent.

2. A process for separating uranium from a flowing stream of radioactive nitric acid feed solution containing uranium, plutonium and fission products including technetium, consisting of:
   (a) flowing an organic extraction agent comprising tri-n-butylphosphate in an organic solvent countercurrent to said stream of feed solution to charge said organic extraction agent with U, Pu and fission products including Tc;
   (b) washing said charged organic extraction agent in a countercurrent of nitric acid solution to remove fission products including Tc;
   (c) flowing said charged organic extraction agent cross-current beneath multiple vertically-flowing individual streams of a reducing agent, comprising U(IV) nitrate and hydrazine nitrate, to remove Pu and remaining fission products including Tc from said charged organic extraction agent;
   (d) flowing said charged organic extraction agent countercurrent to a solution of nitric acid to remove remaining Pu therefrom; and
   (e) separating U from said organic extraction agent.

* * * * *